(12) United States Patent
Miguez Charines et al.

(10) Patent No.: US 12,384,122 B2
(45) Date of Patent: Aug. 12, 2025

(54) MANUFACTURING METHODS OF NET STIFFENERS

(71) Applicant: AIRBUS OPERATIONS, S.L.U., Madrid (ES)

(72) Inventors: Yolanda Miguez Charines, Madrid (ES); Noelia Colas Garcia, Madrid (ES); Augusto Perez Pastor, Madrid (ES)

(73) Assignee: AIRBUS OPERATIONS, S.L.U., Madrid (ES)

( * ) Notice: Subject to any disclaimer, the term of this patent is extended or adjusted under 35 U.S.C. 154(b) by 0 days.

(21) Appl. No.: 18/365,803

(22) Filed: Aug. 4, 2023

(65) Prior Publication Data
US 2024/0051244 A1    Feb. 15, 2024

(30) Foreign Application Priority Data
Aug. 9, 2022    (ES) ............................... ES202230738

(51) Int. Cl.
| | | |
|---|---|---|
| *B29C 70/42* | (2006.01) | |
| *B29C 70/44* | (2006.01) | |
| *B29K 105/08* | (2006.01) | |
| *B29K 307/04* | (2006.01) | |
| *B29L 31/00* | (2006.01) | |

(52) U.S. Cl.
CPC .... *B29C 70/446* (2013.01); *B29K 2105/0872* (2013.01); *B29K 2307/04* (2013.01); *B29L 2031/003* (2013.01)

(58) Field of Classification Search
CPC ... B29C 70/302; B29C 70/446; B29C 70/681; B29C 70/682; B29C 70/683; B29C 70/74; B29C 70/76; B29C 70/78
See application file for complete search history.

(56) References Cited

U.S. PATENT DOCUMENTS

| | | | |
|---|---|---|---|
| 7,905,975 B2 * | 3/2011 | Suzuki | B29C 70/52 156/499 |
| 9,676,147 B2 | 6/2017 | Míguez Charines et al. | |
| 2008/0087768 A1 | 4/2008 | Lloyd | |
| 2011/0220006 A1 * | 9/2011 | Kaye | B29C 70/763 428/192 |
| 2012/0039720 A1 * | 2/2012 | Bech | B29C 70/86 156/243 |
| 2015/0174831 A1 * | 6/2015 | Guez | B29C 70/42 156/196 |

* cited by examiner

*Primary Examiner* — Matthew J Daniels
(74) *Attorney, Agent, or Firm* — Nixon & Vanderhye P.C.

(57) ABSTRACT

Method to make a T shaped stiffener form from a stiffener preform (100) having a foot (130) configured to be in contact with an aircraft panel, and a sole (120) with an edge (120*a*). The manufacturing method includes: obtaining laminates (110*a*, 110*b*) formed of layers of composite material, folding the laminates (110*a*, 110*b*) to be L shaped in cross section, joining the laminates to form a T shaped preform (100), molding the edge of the sole (120*a*) so that the edge is semicircular in cross section, applying to the edge (120*a*) a strip of semi-cured carbon fabric (L1) and a fresh strip of prepreg fiberglass (L2), and curing the preform (100) to obtain the stiffener.

8 Claims, 3 Drawing Sheets

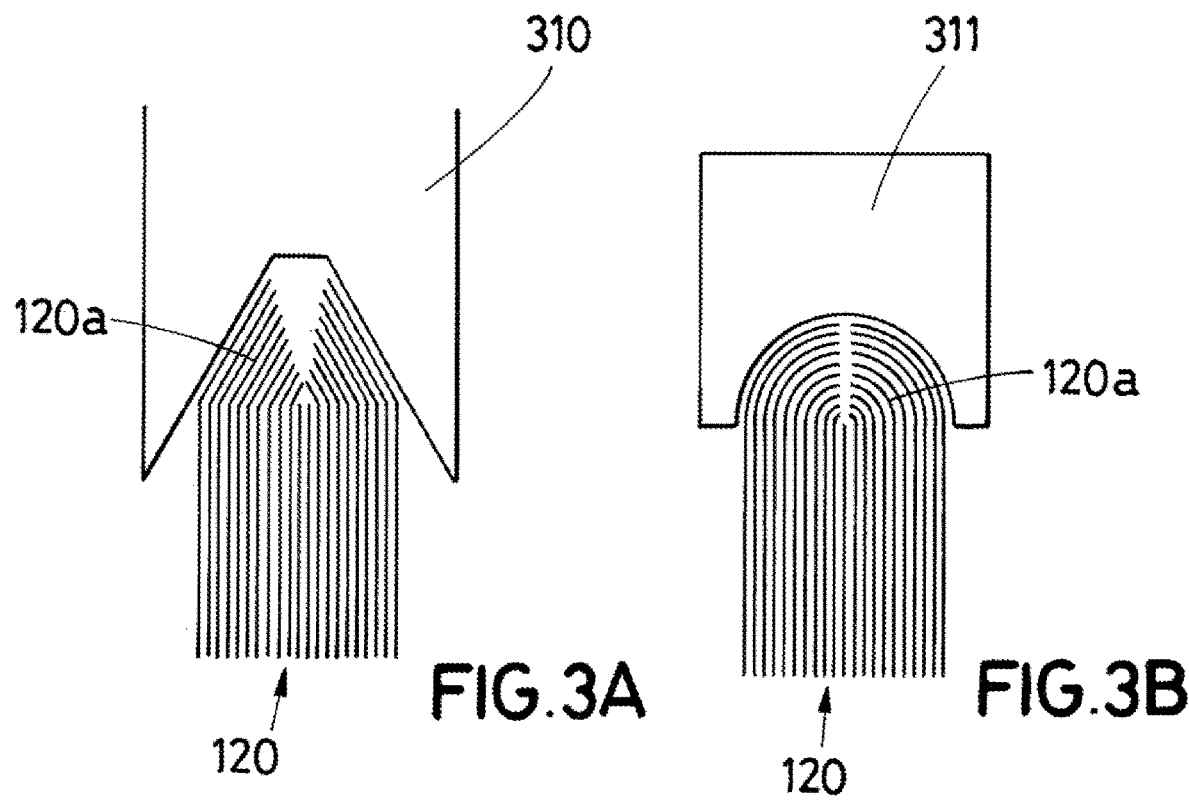
FIG.3A
FIG.3B
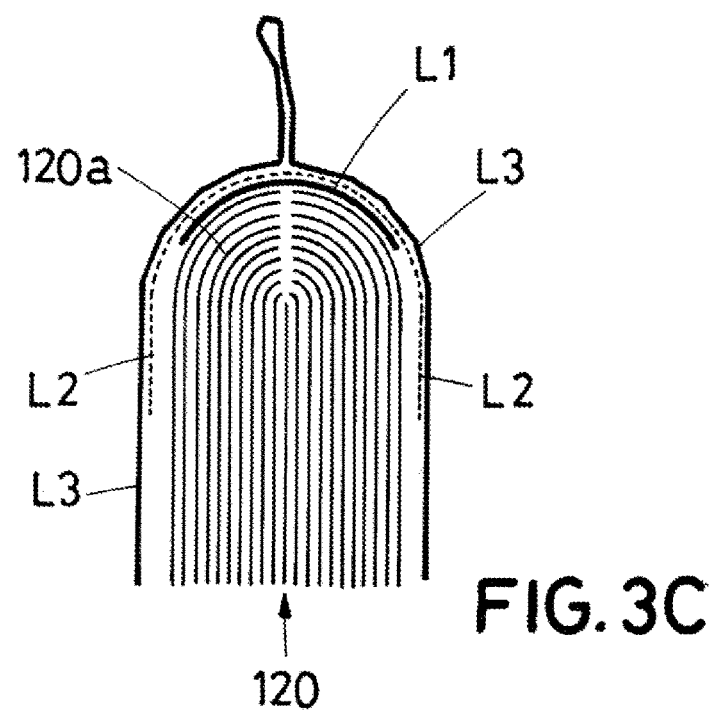
FIG.3C

MANUFACTURING METHODS OF NET STIFFENERS

RELATED APPLICATION

This application incorporates by reference and claims priority to Spanish Patent Application 202230738, filed Aug. 9, 2022.

TECHNICAL FIELD

The field of the present invention refers to manufacturing methods of stiffeners made of polymeric composite material reinforced with carbon fiber, in particular, to methods for obtaining the "net" shape of an edge of the stiffeners that allows eliminating the edging and sealing operations.

BACKGROUND

The standard process for getting the "net" manufacture of an edge of the stiffeners or stringers with a "T" cross section with a "sole" and a "foot" (wherein the foot corresponds to an edge of the stiffener configured to be in contact with an aircraft panel, and wherein the sole corresponds to the remaining part of the stiffener) is to trim excess material by means of a process called edging (i.e., cut the excess material from the edge with a cutter or disc by applying a water jet). The edging process is carried out after the curing of the preform on which the stiffener with a "T" cross section is obtained. The edging is done with specialized equipment, which consumes time, as well as hard and abrasive materials.

The need for edging the edge of the stiffener after curing is due to the poor quality obtained at the edges of the composite laminate preform. If the edge is shaped using shaping tools (e.g., roll shaping), it is highly difficult to match the edge of the already shaped laminate to the cavity of the curing tool. Thus, a gap is generated between the edge of the already shaped laminate and the cavity of the curing tool. This gap is filled with resin and fibers, which reduces the properties of the laminate.

The edging operation can generate delaminations at the edge of the preform subjected to edging and the shaping operation of laminates of composite material can create the so-called book effect.

FIG. 1 shows a preform (100) of a stiffener with a "T" cross section. The preform (100) comprises a sole (120) and a foot (130) (wherein the foot (130) corresponds to the edge of the stiffener configured to be in contact with an aircraft panel). When the preform (100) has been shaped by folding two laminates of composite material (110a, 110b) with an "L" cross section through the "sole" (120) of the stiffener, the different lengths of each layer of the laminates of composite material (110a, 110b) that follow the radius (R) along a fold to create a book effect at the edge of the sole (120a), wherein the inner layers (C) of the laminates of composite material (110a, 110b) are shorter than the outer ones.

Finally, when metal (e.g., aluminum or titanium) parts (e.g., aircraft wing ribs) are close to the edge of the edged stiffener, an additional sealing operation is required to cover the carbon filaments and prevent corrosion on the metal.

The present invention solves the remaining disadvantages in the state of the art at the time of "net" manufacturing of the edge of the sole of a stiffener with a "T" cross section.

DESCRIPTION OF THE INVENTION

The present invention refers to a manufacturing method that allows the "net" manufacturing of an edge of the sole of stiffeners or stringers with a "T" cross section and that avoids existing edging and sealing procedures in the state of the art, by isolating the carbon filaments from the edge of the sole of the stiffener.

Thus, in a first aspect, the present invention relates to a manufacturing method of a stiffener made of polymeric composite material reinforced with carbon fiber, CFRP, with a "T" cross section, wherein the stiffener is obtained from a preform comprising a sole and a foot, wherein the foot corresponds to an edge of the stiffener configured to be in contact with an aircraft panel, and wherein the sole corresponds to the remaining part of the stiffener and which comprises an edge of the sole.

The manufacturing method comprises the step of obtaining two laminates comprising a set of layers of composite material, and the step of shaping each of the two laminates of composite material by folding the laminates of composite material, each laminate with an "L" cross section.

The manufacturing method comprises the step of joining the two laminates to obtain the preform with a "T" cross section. In particular, with two laminates each with an "L" cross section, they can be joined with a sole of the "L" of a first laminate, behind a sole of the "L" of the second laminate, with the edges of the sole at the same height, in such a way as to obtain the preform with a "T" cross section.

The manufacturing method comprises the step of molding the sole edge to obtain a cross section of the semicircular sole edge. The free edge of the sole of the preform is thus rounded, in such a way that it is less prone to delamination or when storing liquids such as water, fat, etc. which over time, could deteriorate the laminate.

The manufacturing method comprises the step of applying a strip of semi-cured fiberglass and a fresh strip of prepreg fiberglass to the edge of the sole. The fiber strips applied to the molded edge of the sole allow the edges of the laminates to be held together, and thus ensure that the edge of the sole will maintain its rounded shape over time, as well as further prevent delamination of the edge of the sole. With strips, the edge of the sole is left with a smooth continuous finish, or "net".

Finally, the manufacturing method comprises the step of curing the preform to obtain the stiffener with a "T" cross section with the net edge of the sole. Once healed, the shape of the edge of the sole, and the strips that cover it, remain in place and their shape remains unchanged.

In a first example, the manufacturing method comprises the step of applying a flexible vacuum bag to the preform prior to curing, which is removed from the stiffener after the curing step.

In a first example, the manufacturing method comprises the step of applying heat to the edge of the sole to soften the set of layers of composite material. The applied heat is low enough that the CFRP resin will not cure.

In a first example, the manufacturing method further comprises molding the edge of the sole to obtain a wedge-shaped cross section prior to the semicircular cross section. Molding the edge of the sole to a wedge-shaped cross section allows for an easier transition from an open "V"-shaped edge of the sole when the two laminates are attached to each other "back-to-back", to a semicircular shape.

Another aspect of the invention refers to a stiffener comprising a specific geometry with a "T" cross section obtained by means of the manufacturing method according to the first aspect of the invention.

A third aspect of the invention refers to a device for molding an edge of a sole of a preform of a stiffener made of polymeric composite material reinforced with carbon fiber, CFRP, with a "T" cross section, wherein the stiffener it comprises a sole and a foot, wherein the foot corresponds to an edge of the stiffener configured to be in contact with an aircraft panel, and wherein the sole corresponds to the remaining part of the stiffener.

The device comprises a heat application device configured to soften the set of layers of composite material at the edge of the sole of the preform and a set of rollers configured to obtain the edge of the sole with a semicircular cross section.

The set of rollers comprises a first group of wedge rollers for molding the edge of the sole with a wedge cross section.

The set of rollers comprises a second group of crescent-shaped rounding rollers for molding the edge of the sole with a semicircular cross section.

SUMMARY OF THE DRAWINGS

To complement the description that is being made and in order to help a better understanding of the characteristics of the manufacturing methods according to the present invention, a set of drawings is attached as an integral part of said description, wherein, for illustrative purposes, and not limiting, the following has been represented:

FIGS. 3A and 3B show the molding steps of the manufacturing process according to the present invention.

FIG. 3C shows the application step to the edge of the sole of a strip of semi-cured fiberglass, a strip of prepreg fiberglass, as well as the application to the preform of a flexible vacuum bag.

DETAILED DESCRIPTION

Figure 1:
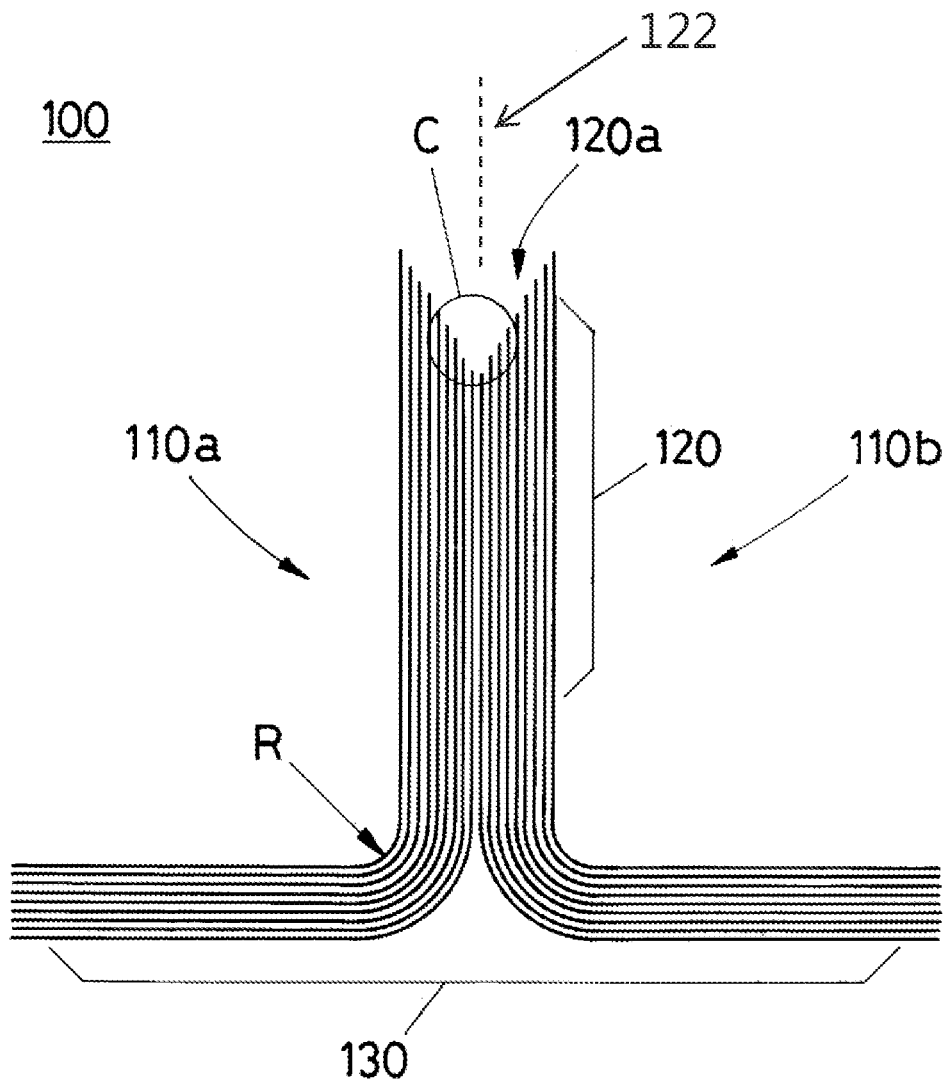
FIG. 1 shows a stiffener preform with a "T" cross section and the book effect generated at the edge of the stiffener sole.

FIG. 1 shows the preform (100) ("fresh" or "pre-cured") obtained after the steps of the manufacturing method according to the present invention corresponding to obtaining two laminates of composite material (110a, 110b) comprising a set of layers of composite material, shaping each of the two laminates of composite material (110a, 110b) by folding the laminates of composite material (110a, 110b) each with an "L" cross section and joining the two laminates of composite material (110a, 110b) to obtain the preform (100) with a "T" cross section.

As seen in FIG. 1, the different lengths of the ends of the layers of the laminates of composite material (110a, 110b) create an open "V"-shaped edge of the sole (120a) which forms a gap at the edge of the sole.

Figure 2:
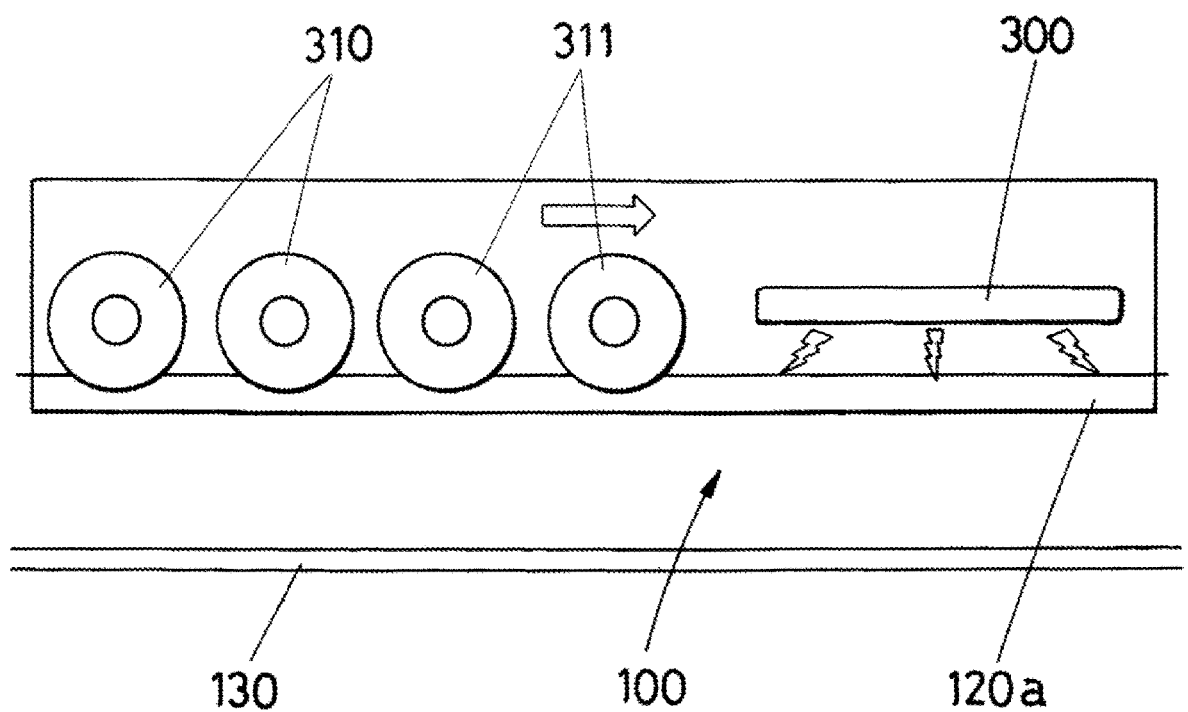
FIG. 2 shows the shaping by molding of the edge of the sole of the preform.

FIG. 2 shows the step of molding (or molding step) the edge of the sole (120a) of the preform (100) that eliminates the book effect, e.g., gap formed by the V-shaped end of the sole, by bending the layers at the V-shaped end inward towards a center plane 122 of the preform (100) for the stiffener.

The molding is carried out after the step of obtaining two laminates of composite material (110a, 110b) that comprise a set of layers of composite material, as shown in the preform (100) of FIG. 1.

The molding is also carried out after the step of shaping the two laminates of composite material (110a, 110b) by folding the two laminates of composite material (110a, 110b) in "L" cross section, and after the step of joining the two laminates of composite material (110a, 110b) with a "T" cross section to obtain the preform (100) of the stiffener.

When folding the two laminates of composite material (110a, 110b), a book effect is generated at the edge of the sole (120a), which can be seen in FIG. 1 of the state of the art, resulting in a "V"-shaped edge of the sole, and is described in the background. In order to eliminate the book effect of the edge of the sole (120a), the manufacturing process according to the present invention comprises the step of molding the edge of the sole (120a) of the preform (100), which is shown in FIG. 2, once the "T" cross section has been obtained.

As shown in FIG. 2, the molding step or operation is carried out with the device (1000) configured to, by means of a heat application device (300), in a first phase, apply heat to the edge of the sole (120a) to soften the set of layers of composite material of said edge, and in a second phase, by means of a set of wedge rollers (310) and a set of rounding rollers (311), mold the edge surface of the sole (120a) to obtain the edge of the sole (120a) with a semicircular cross section. At the end of this step, a rounded shape is created on the edge of the sole (120a), closing the internal gap associated with the shorter interior layers and thus eliminating the book effect.

FIG. 3A shows the step of molding the edge surface of the sole (120a) by means of a group of wedge rollers (310) which comprise a wedge shape to mold the edge of the sole (120a) with a wedge section.

FIG. 3B shows the step of molding the edge surface of the sole (120a) by means of a group of crescent-shaped rounding rollers (311) to mold the edge of the sole (120a) with a final shape comprising a cross section semicircular.

FIG. 3C shows the step of applying to the edge of the sole (120a) a strip of semi-cured fiberglass (L1), a fresh strip of prepreg fiberglass (L2), as well as the application to the preform of a flexible vacuum bag (L3), prior to the curing step, thus achieving a "net" edge of the sole (120a). The net edge of the sole may have a curved outer surface as shown in FIG. 3C.

The edge of the sole (120a) is covered with a semi-cured fiberglass profile (L1), and above it a fresh strip of prepreg fiberglass (L2). The state of the fiberglass profile (L1) provides sufficient rigidity to mold the edge of the sole (120a) in a controlled manner and allows to achieve a good adhesion with the resin of the preform (100). The fresh state of the strip of prepreg fiberglass (L2) makes it possible to fix the semi-cured fiberglass profile (L1) at the edge of the sole (120a) once the preform (100) has cured.

The preform (100) together with the fiberglass profile comprising the strip of semi-cured fiberglass (L1) and the fresh strip of prepreg fiberglass (L2) are cured wrapped in the flexible vacuum bag (L3) which adapts to the real shape of the edge of the sole (120a) when a vacuum is applied to the preform as can be seen in FIG. 3C, achieving good consolidation without movements of resin or fiber, thus obtaining a "net" edge of the sole (120a). Said flexible vacuum bag (L3) can be removed from the stiffener after the curing step.

While at least one exemplary embodiment of the present invention(s) is disclosed herein, it should be understood that modifications, substitutions, and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A manufacturing method to make a stiffener made of polymeric composite material reinforced with carbon fiber wherein the stiffer is T shaped in cross section and the stiffener is formed from a preform comprising a sole and a foot, the foot corresponds to a section of the stiffener configured to contact an aircraft panel, and the sole corresponds to a remaining part of the stiffener and includes an edge, the manufacturing method comprises:
obtaining two laminates of the polymeric composite material each comprising a set of layers of the polymeric composite material;
shaping each of the two laminates of the polymeric composite material to be L shaped in cross section by applying a fold to each of the two laminates of polymeric composite material;
joining the two laminates of the polymeric composite material to form the preform with the T shaped cross section;
molding the edge of the sole of the preform to shape the edge to be semicircular in a cross section of the edge of the sole, wherein the molding the edge of the sole includes first molding the edge to obtain a wedge shaped cross section of the edge and second molding the edge with the wedge shaped cross section to form the semicircular cross section of the wedge;
applying to the edge of the sole a strip of semi-cured fiberglass and a fresh strip of prepreg fiberglass, and
curing the preform with the strip of the semi-cured fiberglass and the fresh strip of prepreg fiberglass to obtain the stiffener with the T shaped cross section.

2. The manufacturing method according to claim 1, further comprising applying heat to the edge of the sole to soften a portion of the set of layers of the polymeric composite material.

3. The manufacturing method according to claim 1, further comprising:
applying a flexible vacuum bag to the preform prior to the step of curing the preform; and
removing the flexible vacuum bag after the step of curing the preform.

4. A method comprising:
folding a first set of layers of a polymeric composite material reinforced with carbon fiber to form a first L shaped laminate including a first foot and a first sole joined to the first foot along a first fold wherein the first sole of the first L shape laminate includes a first back surface facing away from the first foot of the first L shaped laminate;
folding a second set of layers of a polymeric composite material reinforced with carbon fiber to form a second L shaped laminate including a second foot and a second sole joined to the second foot along a second fold wherein the second sole of the second L shape laminate includes a second back surface facing away from the second foot of the second L shaped laminate;
abutting the first back surface of the first L shaped laminate against the second back surface of the second L shaped laminate to form a stiffener preform that is T-shaped in cross section and includes a third foot formed of the first foot and the second foot and a third sole formed of the first sole and the second sole, wherein the third foot of the stiffener preform is configured to attach to a panel of an aircraft and the third sole of the stiffener preform has an edge opposite to the third foot of the stiffener preform;
molding the edge to form a molded edge of the third sole of the stiffener preform, wherein the molding includes shaping ends of the first set of layers and ends of the second set of layers at the edge of the third sole of the stiffener preform inward to close a gap between the ends of the first set of layers and the ends of the second set of layers, wherein the molding the edge of the third sole of the stiffener preform includes molding the edge to first form the edge into a wedge shaped cross section and then molding the edge to have a semicircular cross section;
applying to the molded edge of the third sole of the stiffener preform a strip of semi-cured fiberglass and a fresh strip of prepreg fiberglass, and
curing the stiffener preform with the strip of the semi-cured fiberglass and the fresh strip of prepreg fiberglass to form a stiffener having a T shaped cross section.

5. The method of claim 4, wherein the ends of the first set of layers nearest a center plane of the third sole of the stiffener preform are shorter along a direction of the third sole than the ends of the first set of layers away from the center plane;
wherein the ends of the second set of layers are shorter nearest the center plane than the ends of the second set of layers away from the center plane; and
wherein the molding of the edge of the stiffener preform includes closing the gap such that at least one of the ends of the first set of layers and at least one of the ends of the second set of layers are bent towards the center plane.

6. The method of claim 4, further comprising heating the edge of the third sole of the stiffener preform to soften the ends of the first set of layers and the ends of the second set of layers before or during the molding of the edge of the sole of the stiffener preform.

7. The method of claim 4, further comprising:
applying a flexible vacuum bag to the stiffener preform prior to the curing of the stiffener preform; and
removing the flexible vacuum bag after the step of curing the preform.

8. A method comprising:
folding a first set of layers of a polymeric composite material reinforced with carbon fiber to form a first L shaped laminate including a first foot and a first sole joined to the first foot along a first fold wherein the first sole of the first L shape laminate includes a first back surface facing away from the first foot of the first L shaped laminate;
folding a second set of layers of a polymeric composite material reinforced with carbon fiber to form a second L shaped laminate including a second foot and a second sole joined to the second foot along a second fold wherein the second sole of the second L shape laminate includes a second back surface facing away from the second foot of the second L shaped laminate;
abutting the first back surface of the first L shaped laminate against the second back surface of the second L shaped laminate to form a stiffener preform that is T-shaped in cross section and includes a third foot formed of the first foot and the second foot and a third sole formed of the first sole and the second sole, wherein the third foot of the stiffener preform is configured to attach to a panel of an aircraft and the third sole of the stiffener preform has an edge opposite to the third foot of the stiffener preform;

molding the edge to form a molded edge of the third sole of the stiffener preform, wherein the molding includes shaping ends of the first set of layers and ends of the second set of layers at the edge of the third sole of the stiffener preform inward to close a gap between the ends of the first set of layers and the ends of the second set of layers, wherein the molding of the edge of the stiffener preform includes applying rollers to the edge to mold the edge to have a semi-circular cross section;

applying to the molded edge of the third sole of the stiffener preform a strip of semi-cured fiberglass and a fresh strip of prepreg fiberglass, and curing the stiffener preform with the strip of the semi-cured fiberglass and the fresh strip of prepreg fiberglass to form a stiffener having a T shaped cross section.

* * * * *